Figure 1:
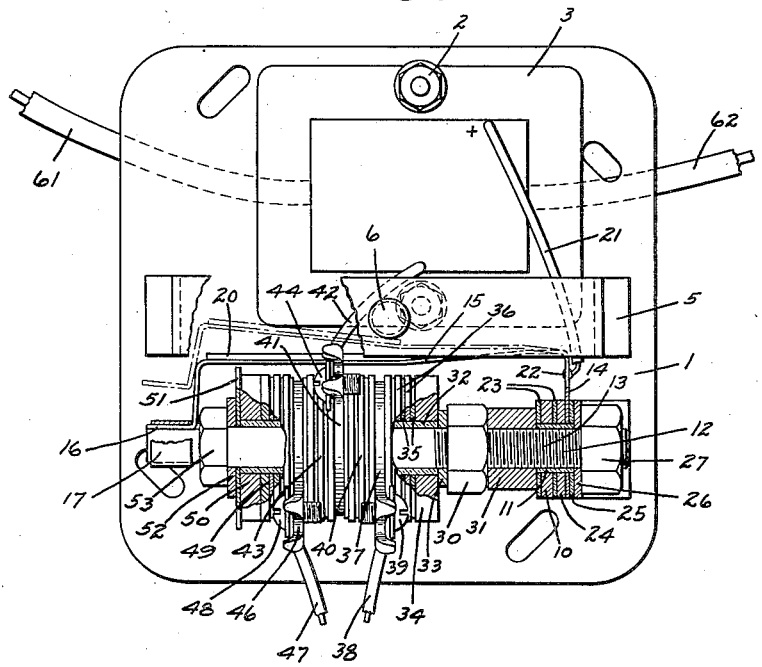

Aug. 29, 1933.  G. D. BOWER  1,924,906

PROTECTING MEANS FOR RECTIFIER TRANSFORMERS

Filed March 23, 1931

INVENTOR
GEORGE D. BOWER
BY
ATTORNEYS

Patented Aug. 29, 1933

1,924,906

UNITED STATES PATENT OFFICE 1,924,906

PROTECTING MEANS FOR RECTIFIER-TRANSFORMERS

George D. Bower, Columbia Heights, Minn., assignors to Minneapolis-Honeywell Regulator Company, Minneapolis, Minn., a corporation of Delaware Application March 23, 1931. Serial No. 524,625

7 Claims. (Cl. 175—366)

This invention relates to improvements in rectifier-transformers and has as its main object to provide means for protecting the rectifying elements against destruction by overheating. Other objects are: to provide fusible means as a mechanical connection for securing one current-carrying element in electrical contact with another so that in case of excessive load on the rectifying elements, the connection will be automatically broken and the parts be positively mechanically and electrically disconnected; to provide a clip composed of a plurality of elements connected together by a fusible solder; to provide an arrangement of the parts of the clip and to so form the clip that it can be operatively positioned by translative motion; to apply the clip to a current-carrying element which forms a support for the rectifier elements; to apply the clip to a portion of a conductor which forms part of the rectifier circuit; to apply the clip to a portion of such conductor which is exposed at a point outside of the rectifying elements; to provide a current-carrier which is resilient and which will spring away from its corresponding element when the clip is fused; to provide such a spring element which bridges the rectifier elements; to limit the motion of the element after release by utilizing as a stop a portion of a transformer which is associated with the rectifier elements; and to provide insulating means to prevent short-circuiting through the transformer when said element engages the transformer as a stop.

Features of the invention include the broader ideas of providing a fusible mechanical device (as distinguished from a fuse) as means for protecting the rectifier elements against injury by over-heating, which means is inserted in an electrical circuit; along with all details of construction disclosed in the drawing and/or described in the specification, and pertaining to the protection feature.

Figure 2:
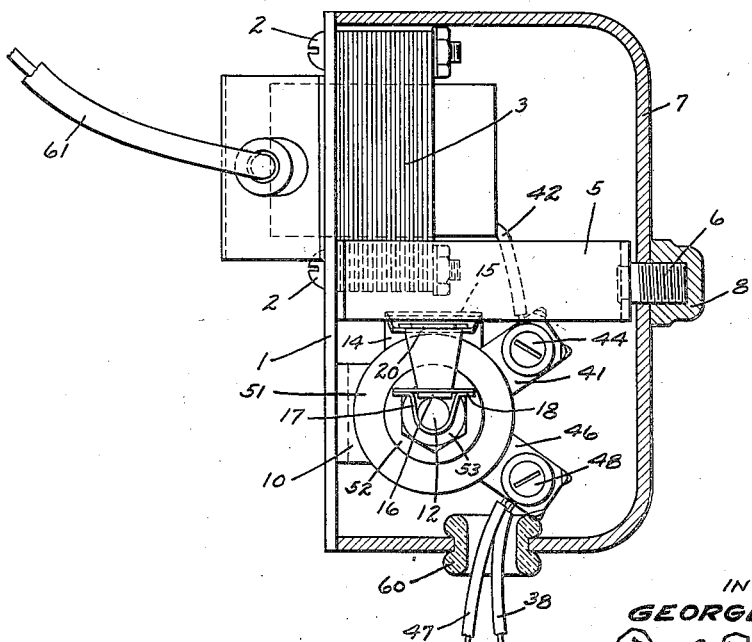

Objects, features and advantages of the invention will be set forth in the description of the drawing forming a part of this application, and in said drawing Figure 1 is a front elevation of the device, partly in section, and with the cover removed; and Figure 2 is an end view with the cover in section.

Numeral 1 indicates a mounting plate or panel having suitably attached thereto by means indicated at 2, a transformer 3. Attached to the plate 1 is a frame 5, U-shaped in plan, and having a screw stud 6, the stud passing through an opening in cover 7. The cover 7 is held by nut 8 cooperating with the threaded stud 6. Mounted also upon this same face of the element 1 is a bracket 10. Passing through an opening in this bracket is a sleeve 11 of insulating material, and passing through and supported in this sleeve is a rod 12 as a support and as part of the rectifier circuit. The rod is threaded as at 13. Supported on the sleeve 11 and, therefore, insulated from the rod 12 at this point is a U-shaped conducting element of copper having one leg 14 traversed by the sleeve 11. This element has a portion 15 which bridges the rectifier disks, and also has a leg terminating in a foot 16, which foot flatly engages a projecting terminal portion of rod 12. A fusible clip 17 secures the foot 16 in electrical contact with the rod. It will be noted, see Figure 2, that the clip may be easily applied by sliding it over the ends of foot and bar axially of the bar, and this clip is composed of two elements secured together by fusible metal such as Wood's metal, or any suitable fusible solder 18. When that amount of heat is developed in or around the rectifier which would, if continued, destroy the rectifying elements, the solder 18 is melted and the conducting element assumes the dotted line position shown. In order to prevent short-circuiting against the transformer 3, a suitable insulating plate 20 is secured upon the top of the portion 15 of the bridge element. The conducting element is connected with one side of the secondary of the transformer by conductor 21, and this conductor is soldered as at 22 to the leg 14. Insulating washers 23 are supported on insulating sleeve 11, against opposite sides of the bracket 10. A brass washer 24 is interposed between one of these insulating washers and the extension or arm 14. At the opposite side of the arm 14 is another washer of insulating material 25, and against this insulating washer is placed a brass washer 26, which also engages the end of the insulating sleeve 11. A nut 27 engages this metal washer. A second nut 30 cooperates with threads 13, and a conducting washer 33 engages one face of the nut, while a spacing collar 31 is arranged between the nut and one of the insulating washers 23. On the rod is arranged an insulating sleeve 32, and upon this sleeve are arranged in succession (reading right to left) metal disk 34 in conducting contact with washer 33 to complete the electrical connection between 34 and 12, lead disk 35, copper disks 36, etc., forming a group of three copper, three lead foil disks. Each copper disk is coated on one face with cuprous oxide, but this has not been shown, inasmuch as it forms no part of the present invention. Full explanation of the rectifying action can be had by inspection of Patent No. 1,640,335 to Grondahl. Next there is a disk 37 to which conductor 38 is attached by a suitable screw 39. Then comes another group 40 of disks. Then a terminal disk 41 having a conductor 42 connecting it with the secondary of the transformer, this conductor being secured to the disk by screw 44. A third group 43 of disks are arranged at the opposite side of the element 41 and then there is a third conductor disk 46 having a conductor 47 secured thereto by screw 48. Then comes a fourth group 49 of disks, and then a terminal conducting member 50, then a washer 51, a washer 52, and nut 53 threaded on rod 12. The clip 17 has been previously described. The conductors 38—47 pass through a suitable eye 60 of insulating material held in cover 7. The main lines to the transformer are indicated at 61—62.

The rectifier, as a uni-directional current-carrying device, has relatively high conductivity for current flowing in one direction, but a relatively low conductivity for current flowing in the opposite direction. This is accomplished in practice by forming directly on one face of each of a series of plates of copper, a surface coating of cuprous oxide. Against the layer of oxide of each plate is placed an electrode comprising one or more plates or sheets of soft impressionable conducting material, such as lead foil. A plurality of groups are used, each group being composed of alternately arranged copper and lead elements, suitably arranged for the intended purpose. The parts are supported on the bolt 12 and are put under compression by nuts 30—53. There is a relatively free flow of electrons in direction from copper to cuprous oxide, the flow of electrons in the other direction being substantially less free. In regard to the specific arrangement of the rectifying elements, and direction of current flow, reference is made to Patent No. 1,640,335.

The use of the fusible link should be distinguished from the use of a fuse in an electrical circuit. The fuse in the present case merely acts mechanically to hold the current-carrying elements together, and over-heating from any source causes fusion of the solder, which releasably unites the clip elements.

I claim as my invention:

1. A rectifier-transformer including a support for the rectifying elements and forming part of the rectifier circuit, a conducting element also forming part of the circuit, and a fusible element which circumscribes the support and conducting element to secure them together in conducting relation, said fusible element being meltable at a temperature lower than that at which injury will occur to the rectifying elements by over-heating, and means adapted to automatically move said conducting element away from the support to break the circuit after fusion of the fusible element.

2. A rectifier-transformer including a conductor which forms part of the rectifier circuit, a second conducting element also forming part of the circuit and means adapted to automatically move said conducting element away from the first mentioned conductor element to break the circuit, a fusible element which circumscribes the conducting elements to hold them in electrical contact, said fusible element being meltable at a temperature lower than that at which injury will occur to the rectifying elements by over-heating.

3. A rectifier-transformer including a support and rectifying elements thereon, the support forming a part of the rectifier circuit, a conducting element also forming part of the circuit and means adapted to automatically move said conducting element away from the support to break the circuit, and a fusible ring releasably securing the conducting element to the support in conducting relation, the support and conductor elements being so arranged that the ring can be applied by translative motion, and said ring being meltable at a temperature lower than that at which injury will occur to the rectifying elements by over-heating.

4. A device of the class described comprising a bar, having thereon rectifying elements, means connecting the bar with the rectifying elements to utilize it in conjunction therewith as a current-carrier, a resilient conducting element bridging the rectifying elements and having one portion supported by the bar and insulated therefrom, and having another portion contacting the bar, means for securing the last mentioned portion of the resilient element in electrical contact with the bar comprising a clip formed of elements secured together by a fusible solder, the solder being meltable at a temperature lower than the temperature at which injury will occur to the rectifying elements by over-heating due to current over-load, or other sources of excessive heat the resilient conducting element being so arranged that on release of the clip elements it springs away from the bar.

5. A device of the class described, comprising a bar having rectifying elements thereon, said bar forming part of the rectifier circuit and projecting beyond the elements, a conducting element also forming part of the circuit and means adapted to automatically move said conducting element away from the bar and having a free end portion which engages the projecting end of the bar, and a fusible ring circumscribing the projecting ends of bar and conducting element to hold them in conducting relation, said ring being meltable at a temperature lower than that at which injury will occur to the rectifying element by over-heating.

6. In a device of the class described, an electrical element which is to be protected from over-heating, a first conductor for the element, a second conducting element engageable with the first, and means adapted to automatically move said conducting element away from the first, and a fusible element which circumscribingly engages the conducting elements to secure them in conducting relation, the said element being fusible at a temperature lower than that at which injury would occur to that element which is to be protected against over-heating.

7. A device of the class described comprising a bar having rectifying elements thereon said bar projecting beyond the elements, and forming part of the rectifier circuit, a conducting element also forming part of the circuit and having a portion which engages the projecting end of the bar, and a ring-like clip releasably securing the said element to said bar, and adapted to be applied or removed by translative motion in direction of the bar axis, said clip being formed of elements secured together by fusible solder which is meltable at a temperature lower than that at which injury will occur to the rectifying elements by over-heating, and means by which the conducting element is automatically moved from its contact-making position when the clip is fused.

GEORGE D. BOWER.